US005458444A

United States Patent [19]
Duncan

[11] Patent Number: 5,458,444
[45] Date of Patent: Oct. 17, 1995

[54] APPARATUS FOR CUTTING A HOLE

[76] Inventor: Ronnie J. Duncan, 1615 N. Ashland, E. Wenatchee, Wash. 98802

[21] Appl. No.: 152,821

[22] Filed: Nov. 15, 1993

[51] Int. Cl.⁶ ..................................... B23B 51/00
[52] U.S. Cl. .............. 408/80; 408/206; 408/225
[58] Field of Search ................... 408/67, 80, 79, 408/113, 117, 118, 119, 132, 134, 201, 206, 208, 225

[56] References Cited

U.S. PATENT DOCUMENTS

| | | | |
|---|---|---|---|
| 2,306,807 | 12/1942 | Halvey et al. | 408/206 |
| 2,435,648 | 2/1948 | Frevel | 408/206 |
| 2,777,341 | 1/1957 | Marchant | 408/80 |
| 4,127,355 | 11/1978 | Oakes | 408/225 |

FOREIGN PATENT DOCUMENTS

| | | | |
|---|---|---|---|
| 26096 | 2/1884 | Germany | 408/80 |
| 282475 | 5/1915 | Germany | 408/206 |
| 1959727 | 6/1971 | Germany | 408/80 |

*Primary Examiner*—Daniel W. Howell
*Attorney, Agent, or Firm*—Mark Zovko

[57] ABSTRACT

Apparatus for cutting a smooth concentric hole in a metal workpiece. The apparatus fits in a standard industrial drill chuck and has a pilot drill and tap at one end which drills and taps a pilot hole seating a mandrel on the metal workpiece. When the mandrel is seated, a cam plate and spring arrangement automatically advances the cutting teeth and provides the proper pressure on the cuttering teeth to cut the hole. The cutting teeth have a special anti-breakthrough portion which provides controlled drilling of a smooth hole. A clutch is provided which controls the torque delivered to the apparatus and allows the cam plate to function properly. The device may be adapted easily to accommodate various hole sizes by changing its faceplate.

29 Claims, 7 Drawing Sheets

APPARATUS FOR CUTTING A HOLE

BACKGROUND OF THE INVENTION

1. Field of the Invention

This invention relates in general to apparatus for cutting a hole in a workpiece and more particularly to a tool used in conjunction with a standard ½" industrial quality drill which quickly and efficiently cuts a hole in metal for electrical conduit.

2. Description of the Prior Art

Several well-known tools can be used to cut holes in a workpiece. For use in wood applications, it is conventional to use a special hole cutting bit with a standard drill. A door knob hole, for example, can be cut using this type of bit and a standard industrial quality drill. In metal applications, a well-known device termed a "Uni-bit" can be used again in conjunction with a standard drill. Alternatively depending on the hole size, a metal punch may be used in certain applications.

Disadvantages of the above-mentioned devices exist which limit their utility. If the object in a given application is to quickly and efficiently drill a smooth, true, concentric hole in a metal workpiece such as a panel for disposing electrical conduit therein, the previously mentioned conventional devices have several shortcomings. Smoothness of the drilled hole is occasionally compromised due to premature breakthrough of the hole cutting bit. Devices which rely on a pushing force by the operator have problems in certain applications since manually maintaining a constant pressure on the cutting bit during the entire operation is difficult, and when a constant pressure on the cutting bit is not maintained, a less than smooth hole may result. Also, conventional cutting teeth tend to prematurely break through the metal even if a constant pressure is maintained in certain metal applications which causes a rough and less than concentric hole. The present invention overcomes these disadvantages and provides a hole cutting tool which efficiently and precisely cuts a hole in metal and can be adapted to accommodate a wide range of hole sizes.

SUMMARY OF THE INVENTION

The apparatus of the present invention cuts a smooth hole in a workpiece such as metal and is especially useful in application which involves the installation of electrical conduit. Electrical conduit may be precisely installed through metal barriers using the tool disclosed herein. Although the apparatus of the present invention is described herein as especially applicable to making holes in metal for electrical conduit, many other useful applications can be imagined with little adaption of the apparatus. The apparatus of the present invention, generally, is comprised of the following basic parts which first includes mounting means for mounting the apparatus to the metal workpiece. After the apparatus is suitably attached (preferably threaded as will be subsequently disclosed) to the workpiece, torque means is used to drive cutting means thereby making the hole in the workpiece. To alleviate the need for the operator applying pressure to the apparatus as the hole is being cut, pressure means is present for applying constant pressure to the cutter means as the hole is being cut.

More specifically, in a preferred embodiment, the means for mounting the tool on the apparatus includes a pilot drill and tap means. The pilot drill and tap is located at the extreme end of the tool. Initially, the drill bit of the pilot drill makes a small hole in the workpiece which is then tapped with internal thread from a tap section located on the pilot drill and tap means immediately adjacent to the pilot drill bit. After the hole is tapped producing an internal thread, a third section of the pilot drill and tap means having an external thread is threaded into the tapped hole. After threading the external threaded section of the pilot and drill means into the tapped hole, the apparatus is thereby threadingly attached to the workpiece prior to the desired hole for electrical conduit or the like being cut. It can be noted that in existing drill and tap systems, a small concentric area of the workpiece around the tapped hole is destroyed by flats that exist due to the tap being taper ground from a full diameter thread before the thread is established in the workpiece. Loss of this area is a problem, especially in thin workpiece sections such as sheet metal. In the drill and tap means of the present invention, an improved tap means, as will be subsequently described and illustrated in detail, begins cutting a sharp thread at the first revolution and by being larger (i.e., tapered) at each revolution, each revolution progressively increases the sharp or pointed thread portion with each revolution, eliminating any lost thread portion. Further, the compression portion of the drill and tap means is a tapered full thread (without cutting slot) which wedges the metal of the workpiece outward. The metal of the thread is thereby densified, improving thread quality and metal fatigue resistance due to stress cracks. Also in this drill and tap means, the drill diameter continues through the tap, alignment is automatically done, eliminating wobble which can be a large factor, especially in hand held applications and deep tapping operations.

The cutting means of the present invention includes cutter teeth held fixedly in a plurality of cutter holder assemblies. The cutter holder assemblies are attached in appropriately spaced sections on a face plate. The face plate has a hole therethrough which receives a mandrel. The mandrel contacts the workpiece once the pilot drill and tap assembly attaches the tool to the workpiece. The cutter holder assemblies can be adjusted within the face plate to accommodate various sizes of holes which correspond to standard conduit sizes. Further, different sized faceplates can be used to further expand the range of hole sizes which can be cut using the tool. A cam plate and spring assembly will automatically advance the cutter teeth once the pilot hole is drilled and tapped and the mandrel is seated on the workpiece. A constant pressure is applied to the cutter teeth by the cam plate and spring drive assembly pressure as the desired hole is being cut. It is not necessary for the operator to apply pushing force to the tool. An adapting plate is provided between the face plate and the camming plate.

The apparatus has torque means which transmit the torque from the drill used with the present apparatus to the pilot drill and tap assembly and the cutter teeth. The torque means includes a clutch assembly including a mandrel, and clutch spring mounted in a clutch housing. The clutch assembly transmits torque to the pilot drill and tap assembly until the pilot hole is drilled, tapped and the mandrel is seated on the workpiece. At this point, the clutch assembly begins slipping and the camming plate advances the cutter teeth which are now driven to cut the desired hole.

The cutter teeth have a significant feature which provides for the overall improved performance by the present invention. The cutter teeth have a cutting portion and a ramp portion with the ramp portion partially preventing the entire cutting portion from contacting the workpiece. The hole can then be formed in a controlled way producing a smooth, precise hole.

It is the object of the present invention to provide a device for cutting holes for use in conjunction with a standard industrial drill which produces smooth and precise holes for electrical conduit in a metal workpiece.

Another object of the present invention is to provide pilot drill and tap assembly which drills and taps a pilot hole in an improved and effective manner.

A further object of the present invention is to provide an electrician's hole cutting assembly which is portable and can accommodate a variety of hole sizes up to five inches.

Yet another object of the present invention is to provide a hole cutting apparatus which improves upon the versatility of conventional hole cutting art.

Another object of the present invention is to provide an improved cutter tooth which reduces metal breakthrough as the hole is being cut.

These and other objects of the present invention will become more apparent from the following detailed description when taken in conjunction with the attached drawings.

DESCRIPTION OF THE PREFERRED EMBODIMENT

Figure 1:
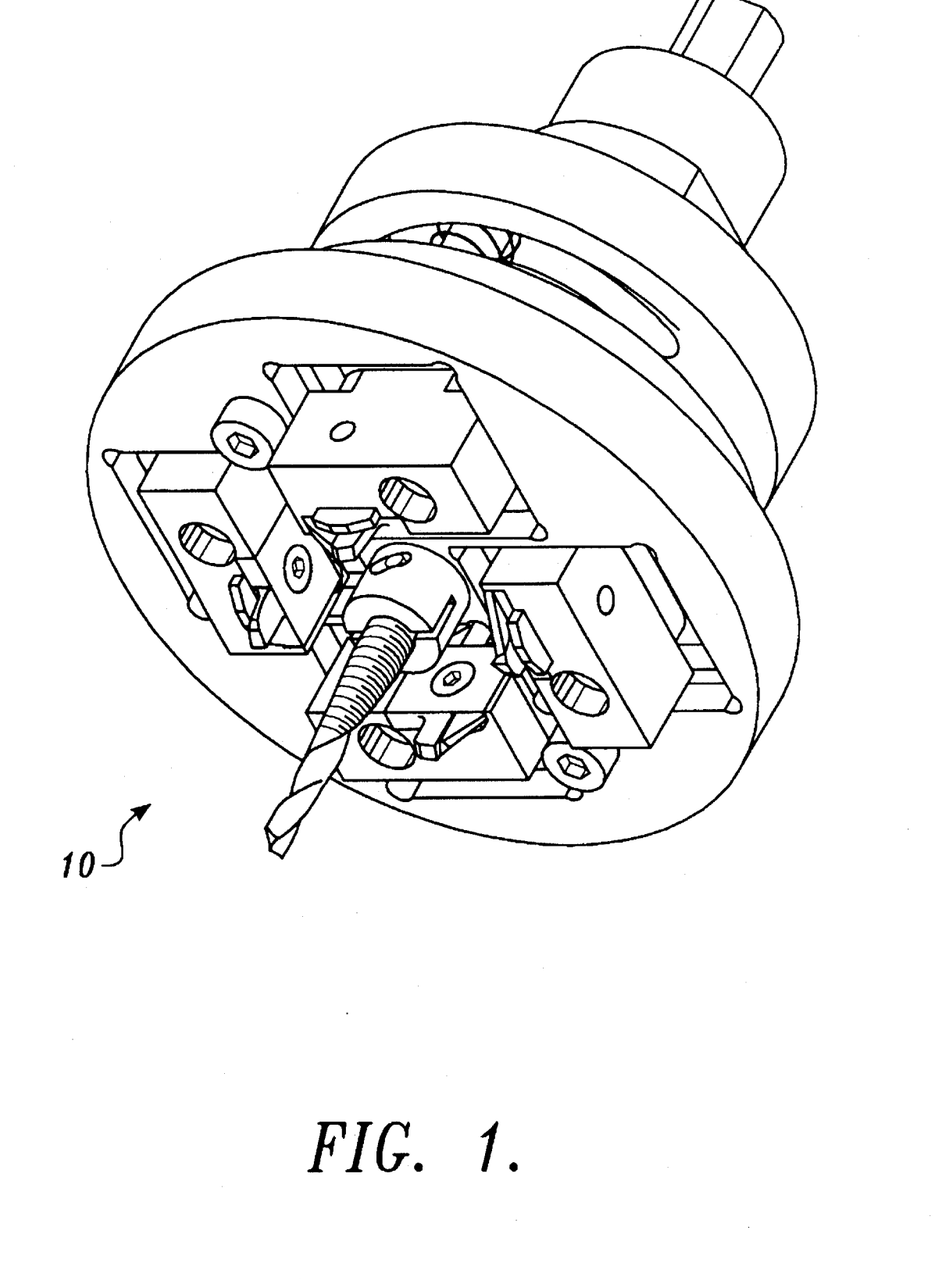
FIG. 1 is an isometric view of the apparatus of the present invention.
Figure 2:
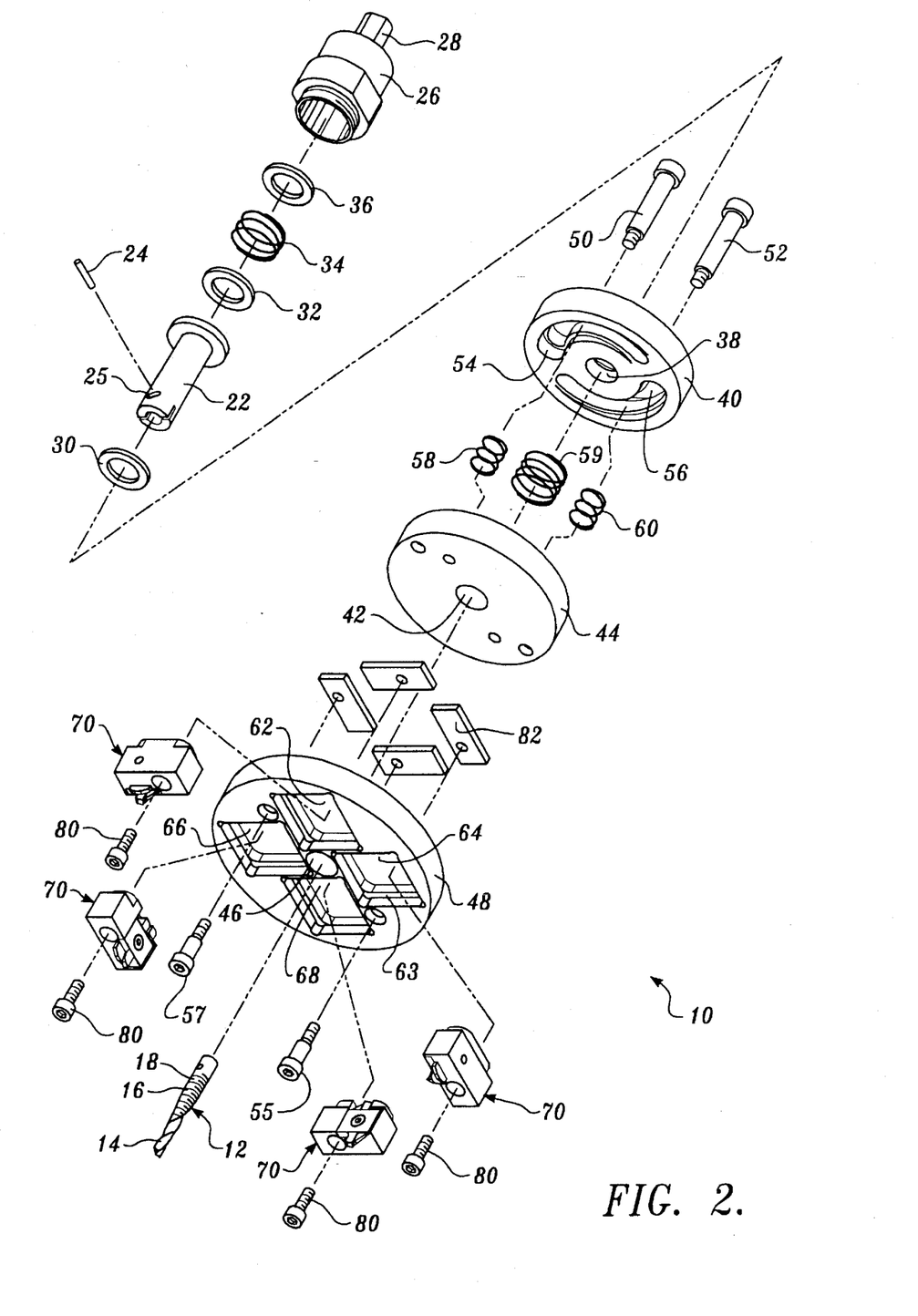
FIG. 2 is an exploded view of the present invention.
Figure 3A:
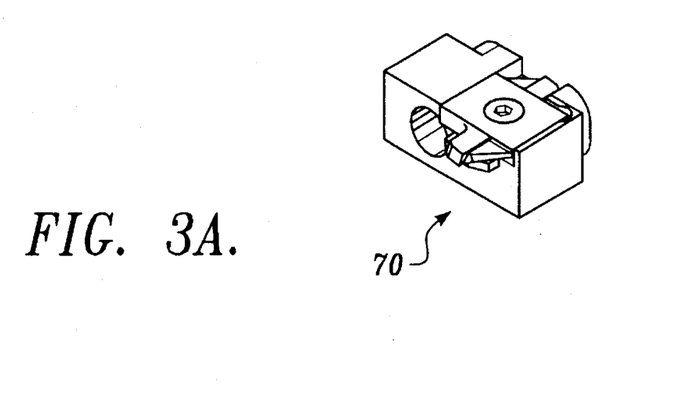
FIG. 3A is an isometric view of a cutter assembly of the present invention.
Figure 3B:
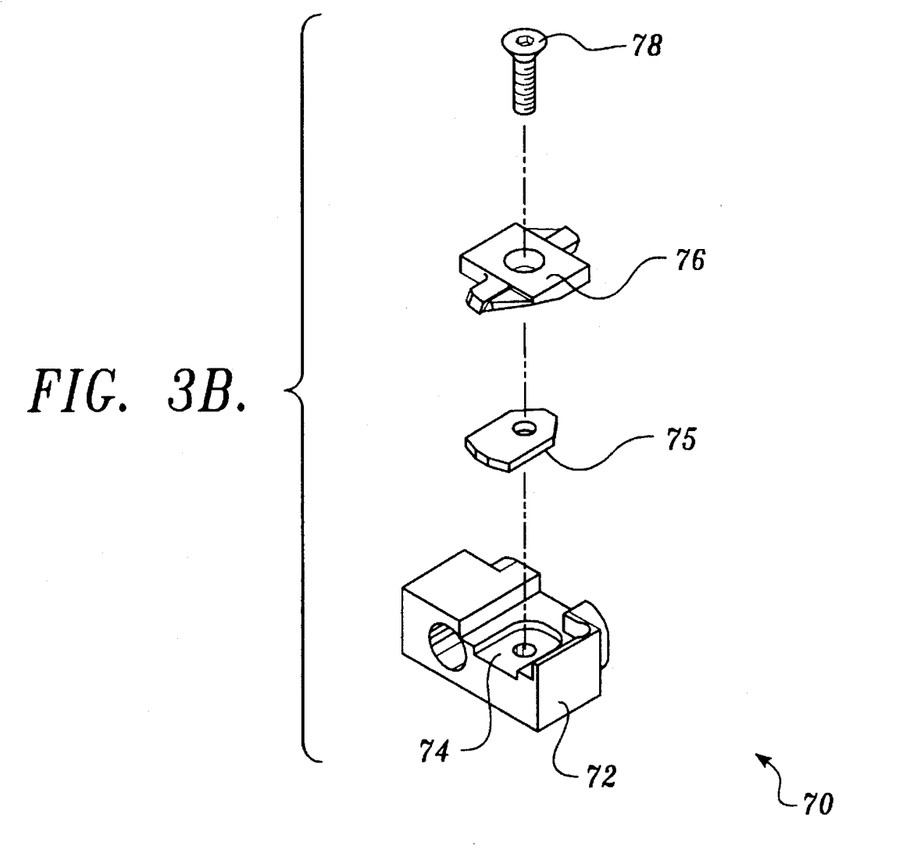
FIG. 3B is an exploded view of a cutter assembly of the present invention.

Referring to the Figures, especially FIGS. 1 and FIGS. 3A, 3B the present invention can be described. The apparatus is generally designated as 10. Apparatus 10 is made to fit on a heavy duty low RPM industrial quality drill (not shown) having a chuck size of ½". Preferably, the drill used in conjunction with the present apparatus will be of a conventional angle head design or have anti-rotation handles. The apparatus 10 has a drill and tap bit (FIG. 4A) designated generally as 12 which has a pilot drill portion 14, a tap portion 16 and a threaded portion 18. The tap portion 16 has a slot 20 therein which is conventional. The drill and tap bit 12 is disposed in a mandrel 22 and fixed with set screw 24. Set screw 24 is fit through an elliptical slot 25. The shape of this slot allows a "quick release" of the drill and tap bit assembly 12 from the workpiece, if desired, without other tools as the mandrel 22 can be moved counterclockwise slightly by hand, thereby unthreading the tool from the workpiece. One end of mandrel 22 is disposed within a clutch housing 26. Clutch housing 26 has a flange 28 at one end which fits with the drill chuck (not shown). Within clutch housing 26 is a first friction drive clutch washer 30 and backup washer 32. A clutch spring 34 fits against washer 32 at one end and against another friction drive clutch washer 36 at its other end. The washer and clutch spring arrangement is best shown in FIG. 5. Mandrel 32 fits through a hole 38 in a cam plate 40, a hole 42 in a face plate adapter 44, and through hole 46 in face plate 48. The cam plate 40 is held to face plate adapter 44 by two screws 50 and 52. The screws 50 and 52 fit within slots 54 and 56 of cam plate 40. Drive springs 58 and 60 fit over the ends of screws 50 and 52 which protrude from the cam plate 40 and fit against the face plate adapter 44 at one end and the cam plate 40 at the other end. Face plate 48 is held to face plate adapter 44 with a pair of face plate screws 58 and 60. The face plate 48 has a plurality of recessed portions 62, 64, 66 and 68. Each recessed portion holds a cutter assembly generally designated as 70. Cutter assembly 70 is comprised of a cutter holder 72 having a cutter holder recess 74. Within cutter holder recess 74 fits a cutter insert or tooth 76 which is screwed into cutter holder recess 74 by a cutter insert screws 78. The cutter holder 72 is fastened to the recessed portions 62, 64, 66 and 68 of the face plate 48, by a cutter holder bolt 80 and butter back up nut 82. The cutter back up nut is shaped in a similar manner to the recessed portions of the face plate 48. The above described arrangement thereby gives a flexibility of the apparatus to accommodate a variety of desired drilled hole sizes, especially including ¾", 2", and 5" maximum sizes by simply changing the size of the face plate 48.

Figure 7A:
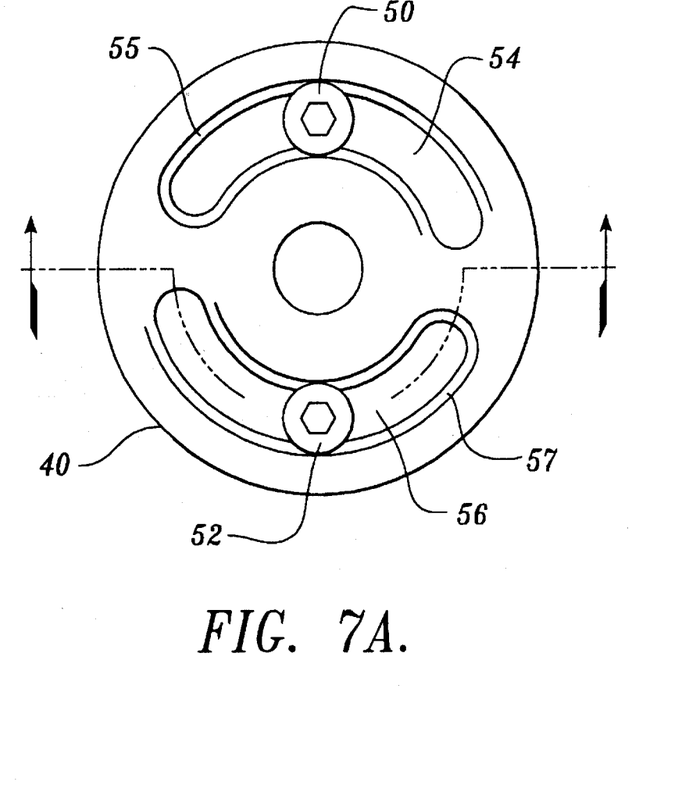
FIG. 7A is a front view of the cam plate of the present invention.
Figure 7B:
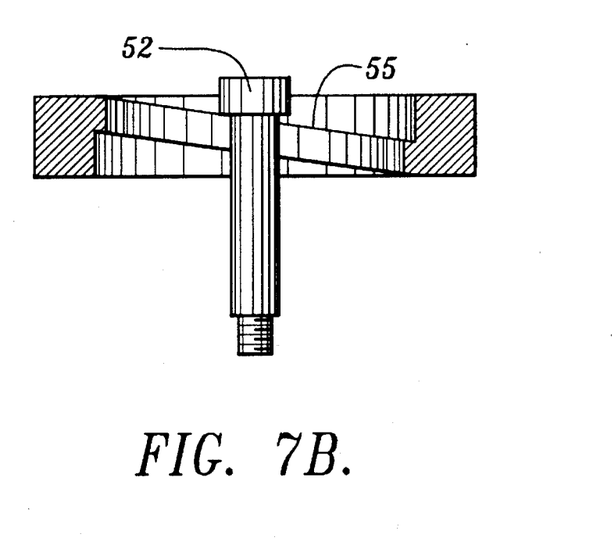
FIG. 7B is a side view of the cam plate partially cut away showing a portion of the helical track within the arcuate slots of the cam plate.

FIG. 7A shows the cam plate 40 of the present invention. Cam plate 40 has two arcuate slots 54 and 56. These slots have helical tracks 55 and 57 within the slots 54 and 56, respectively. The underside of the heads of screws 50 and 52 rests on these tracks 55 and 57. If the cam plate 40 rotates clockwise relative to a fixed mandrel 22 as happens during operation of the tool after the tool is threaded to the workpiece, the cam plate 40, due to the screws 50 and 52 being held in helical tracks 55 and 57, advances face plate 48 with the cutter assemblies 70, thereby allowing cutting of the hole to begin.

Figure 6A:
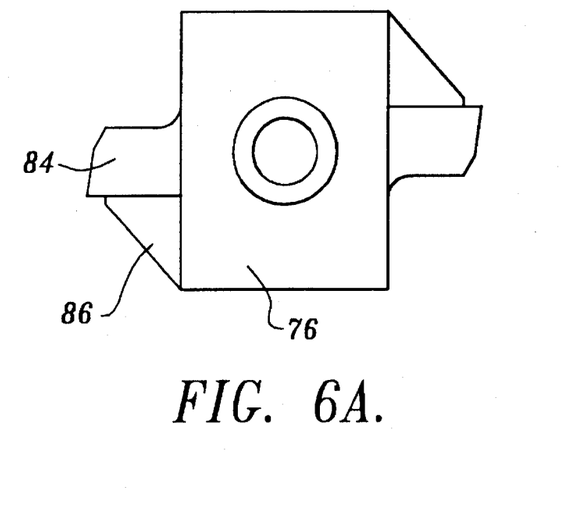
FIG. 6A is a plan view of a cutter tooth in accordance with the present invention.
Figure 6B:
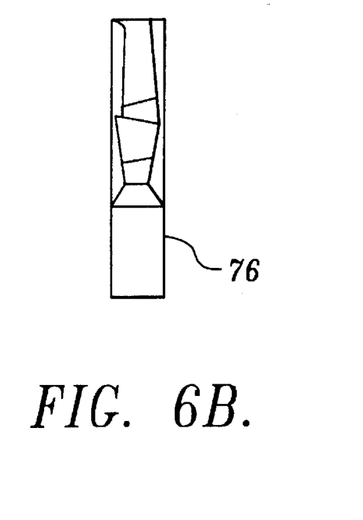
FIG. 6B is a side view of a cutter tooth in accordance with the present invention.
Figure 6C:
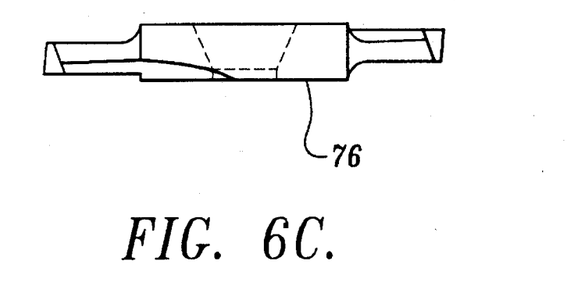
FIG. 6C is an elevation view of a cutter tooth in accordance with the present invention.

Referring now to FIGS. 6A–6C, a detail of a cutter tooth 76 is shown which has a cutting edge portion 84 and a ramp portion 86. Ramp portion 86 prevents the entire cutting edge portion 84 from contacting the metal to be drilled. A controlled drilling of a hole through the workpiece minimizing any negative effects of breakthrough of the metal by the cutting teeth. Only a small part of the cutting edge portion 84 of the cutter tooth 76 is exposed to the metal thus preventing breakthrough problems so common in other hole-making drills in the present art.

Figure 4A:
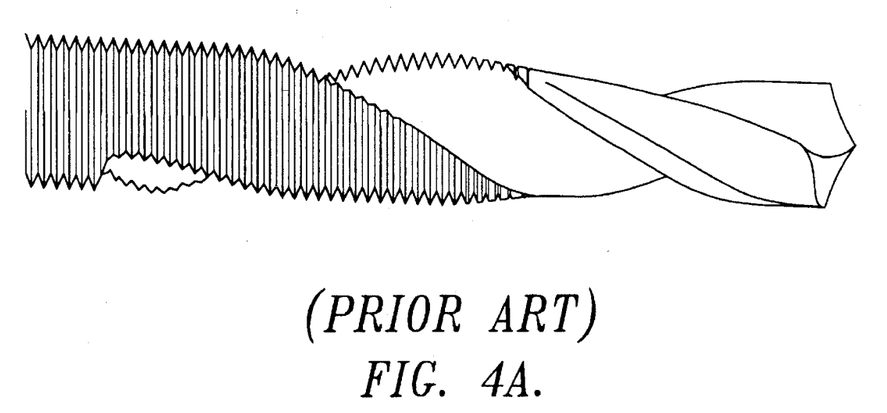
FIG. 4A is a cross-sectional view of a conventional drill and tap for use with the present invention.
Figure 4B:
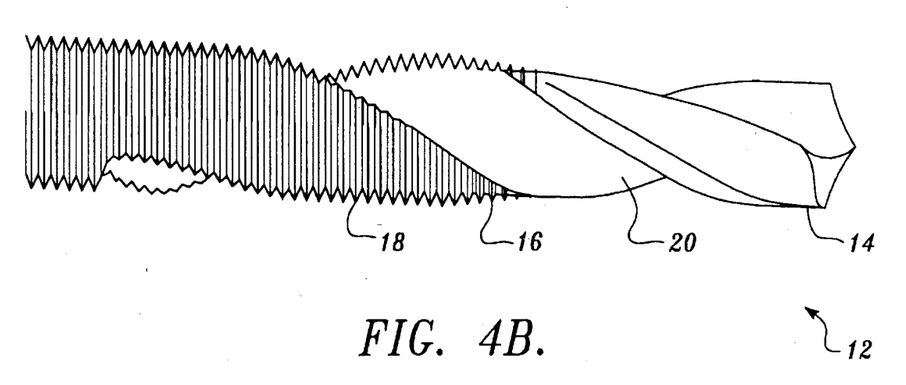
FIG. 4B is a cross-sectional view of an improved drill and tap used with the present invention.
Figure 5:
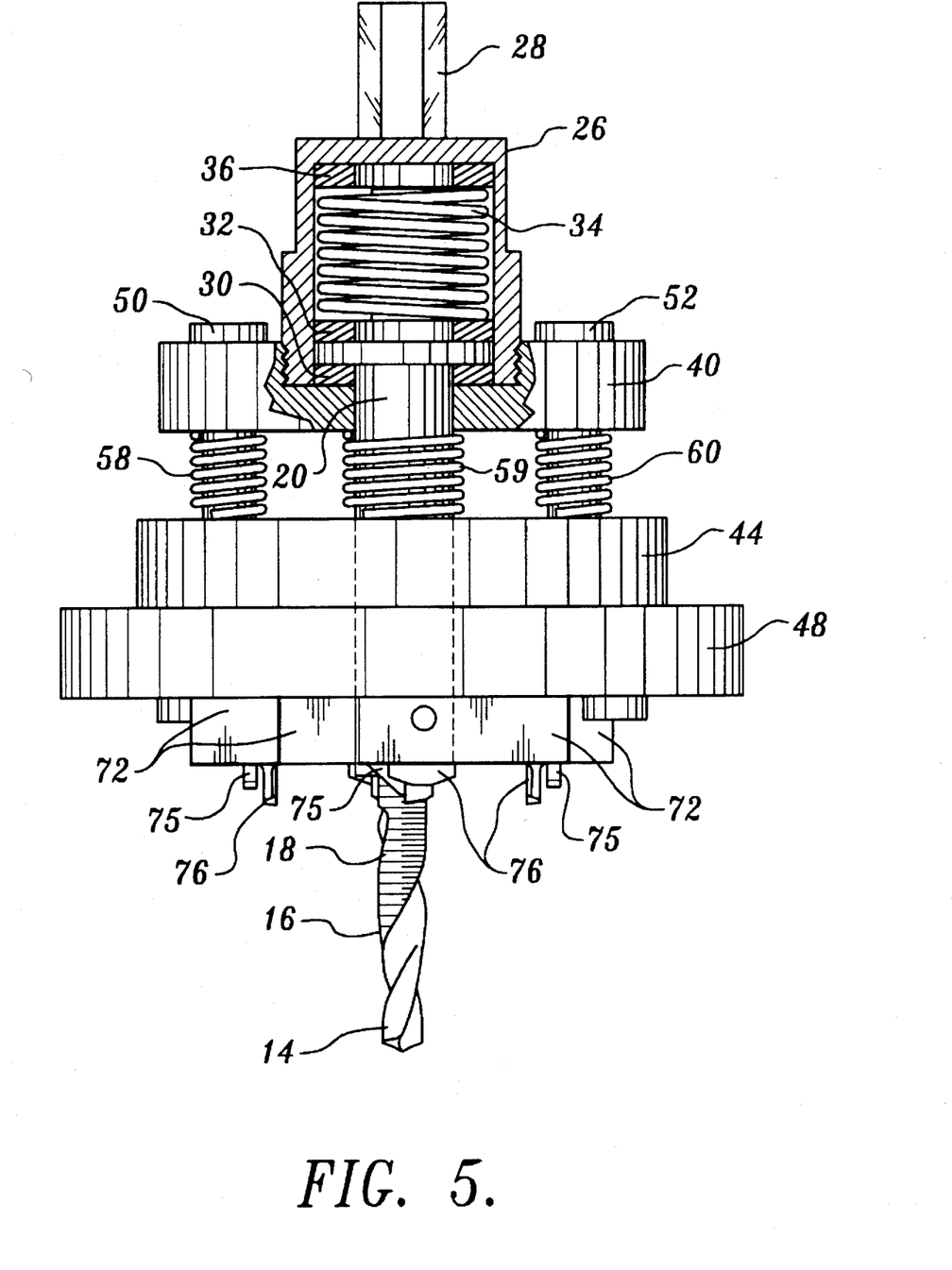
FIG. 5 is an elevation view of the present invention in partial cross section.

Referring to FIGS. 4A and 4B, the drill and tap portion 12 of the present invention can be described in further detail. FIG. 4A shows a cross section of existing drill and tap design. A problem occurs because a small area of metal around the circumference of the hole is lost because the tap section 16 has flat portions due to the tap being taper ground from a full diameter thread before the thread is established in the workpiece. This problem is especially damaging in thin workpieces such as sheet metal. FIG. 4B shows a preferred drill and tap in accordance with the present invention. The tap section 16 begins by cutting a sharp thread at the first revolution and progressively getting larger due to its taper. Each revolution thereby increases the sharp or pointed thread portion, eliminating any lost thread portion. Further, the compression or threaded portion 18 is a tapered full thread which wedges the metal of the workpiece outward, thereby densifying the metal of the thread. Thread quality is thereby improved along with metal fatigue resistance, as stress cracks are reduced. Another advantage to the configuration of the drill and tap section shown in FIG. 4B is that tap alignment is automatically done by the drill diameter continuing through the tap, thereby eliminating wobble in hand done applications and deeper tapping operations.

In operation, the apparatus of the present invention is disposed at one end into a conventional drill. Flange 28 is fit within the drill chuck of the drill (not shown) and held in place. The cutting apparatus is then used to start a pilot hole in the workpiece. The pilot drill will begin drilling a small pilot hole which will be tapped by the tap portion 16 of the pilot drill and tap bit 12. The threaded portion of the pilot drill and tap bit 12 will subsequently and in an automatic manner secure the apparatus 10 to the workpiece with the one end of the mandrel 22 seated on the workpiece.

It should be noted that in thin or soft sections, if the tapped hole fails to secure the apparatus to the workpiece in a suitable manner, a nut (not shown) can be threaded on the drill and tap bit 12 from the back of the workpiece. Once the mandrel 22 is seated, however, the cam plate 40 will be forced to rotate clockwise relative to the mandrel 22. Screws 50 and 52 held in helical tracks 55 and 57, will advance the cam plate 40 and therefore the face plate 48 with cutter teeth. Springs 58 and 60 acting on cam plate 40 provide proper pressure on the face plate 48 and cutter teeth to drill the hole. The clutch spring washers will transmit the torque from the drill to the cam plate 40 and face plate 48 allowing rotation of cam plate 40, face plate 48 and cutter teeth 76 relative to the mandrel 22 which is seated in the workpiece. The desired hole can be cut by the rotating cutter teeth 76 with the breakthrough problems minimized. Pushing force by the operator during hole cutting is not required as the cam plate 40 and drive springs 58 and 60 provide a constant pressure on the cutting teeth 76. After completion of cutting the hole, the face plate 48 should be turned counter clockwise which will result in withdrawal of the cutting teeth 76 into the recessed portion of the face plate. It should be noted that before drilling the pilot hole, the cutting teeth should be retracted within the recessed portion 62, 64, 66 and 68 of the face plate by rotating the face plate 48 in the counter clockwise direction or opposite to the way the drill will drive the teeth. Also, any slug of metal on the pilot drill and tap bit can be removed by rotating the slug counter clockwise. Different sized holes can be cut by changing the size of face plate 48.

The invention may be embodied in other forms without departing from the spirit or essential characteristics thereof. The present embodiments are therefore to be considered in all respects as illustrative and not restrictive, the scope of the invention being indicated by the append claims rather than the foregoing description, and all change which comes within the meaning and range of equivalency of claims are intended to be embraced therein.

What I claim is:

1. Apparatus for cutting a hole in a workpiece comprising:
   a. a pilot drill and tap means for drilling a pilot hole and tapping said hole whereby the apparatus may be attached to the workpiece;
   b. cutting teeth for cutting a hole in the workpiece, said cutting teeth mounted to a cutter holder;
   c. pressure means for advancing said cutting holder and cutting teeth and applying constant pressure to said cutter holder as the hole is being cut;
   d. torque means for driving said cutter holder and cutting teeth, thereby making a hole in the workpiece.

2. The apparatus of claim 1 wherein said cutting teeth have a cutting portion and a ramp portion, said ramp portion partially preventing said cutting portion from contacting the workpiece.

3. The apparatus of claim 1 wherein said pressure means includes a camming plate and retaining spring means connected to said cutter holder.

4. The apparatus of claim 3 wherein said pressure means includes adapting means which holds said cutter holder to said camming plate and retaining spring means.

5. The apparatus of claim 1 wherein said torque means includes a mandrel and clutch means connected to said mandrel.

6. Apparatus for cutting a hole in a workpiece comprising:
   a. a pilot drill and tap means for drilling a pilot hole and tapping said hole whereby the apparatus may be threadingly attached to the workpiece;
   b. cutting means for cutting said hole in said workpiece;
   c. a camming plate and retaining spring means attached to said cutting means for advancing said cutting means and applying a constant pressure on said cutting means as the hole is being cut in the workpiece;
   d. torque means for driving said cutting means thereby making a hole in the workpiece.

7. The apparatus of claim 6 wherein said cutting means includes cutting teeth mounted to a cutter holder, said cutting teeth having a cutter portion and a ramp portion, said ramp portion partially preventing said cutting portion from being exposed to the workpiece.

8. The apparatus of claim 6 which includes an adapter plate which holds said cutting means to said camming plate and retaining spring means.

9. The apparatus of claim 6 wherein said torque means includes a mandrel and clutch means connected to said mandrel.

10. Apparatus for cutting a hole in a workpiece comprising:
    a. a pilot drill and tap means for drilling a pilot hole and tapping said hole whereby the apparatus may be threadingly attached to the workpiece;
    b. cutting means for cutting said hole in said workpiece;
    c. pressure means for advancing said cutting means and applying constant pressure to said cutting means as the hole is being cut;
    d. a mandrel and clutch means for driving said cutting means thereby making a hole in said workpiece.

11. The apparatus of claim 10 wherein said cutting means includes cutting teeth mounted to a cutter holder, said cutting teeth having a cutting portion and a ramp portion, said ramp portion partially preventing said cutting portion from being exposed to said workpiece.

12. The apparatus of claim 10 wherein said pressure means includes a camming plate and retaining spring means connected to said cutting means.

13. The apparatus of claim 11 wherein said pressure means includes adapting means which holds said cutting means to said camming plate and retaining spring means.

14. Apparatus for cutting a hole in a workpiece comprising:

a. mounting means for mounting said apparatus to said workpiece;

b. cutting teeth for cutting a hole in the workpiece, said cutting teeth mounted to a cutter holder;

c. a camming plate and retaining spring means attached to said cutter holder for advancing said cutter holder and said cutting teeth and applying a constant pressure on said cutter holder and cutting teeth as the hole is being cut in the workpiece; and d. torque means for driving said cutter holder and said cutting teeth thereby making a hole in the workpiece.

15. The apparatus of claim 14 wherein said mounting means includes a pilot drill and tap means for drilling a pilot hole and tapping said hole whereby the apparatus may be threadingly attached to the workpiece.

16. The apparatus of claim 14 wherein said torque means includes a mandrel and clutch means connected to said mandrel.

17. Apparatus for cutting a hole in a workpiece comprising:

a. mounting means for mounting said apparatus to said workpiece;

b. cutting teeth for cutting a hole in the workpiece, said cutting teeth mounted to a cutter holder;

c. pressure means for advancing said cutter holder and said cutting teeth and applying constant pressure to said cutter holder and cutting teeth as the hole is being cut; and d. a mandrel and clutch means for driving said cutter holder and cutting teeth thereby making a hole in said workpiece.

18. The apparatus of claim 17 wherein said mounting means includes a pilot drill and tap means for drilling a pilot hole and tapping said hole whereby the apparatus may be threadingly attached to the workpiece.

19. The apparatus of claim 17 wherein said pressure means includes a camming plate and retaining spring means connected to said cutter holder.

20. The apparatus of claim 19 wherein said pressure means includes adapting means which holds said cutter holder to said camming plate and retaining spring means.

21. Apparatus for cutting a hole in a workpiece comprising:

a. mounting means for mounting said apparatus to said workpiece;

b. cutting means for cutting a hole in said workpiece;

c. a camming plate and retaining spring means attached to said cutting means for advancing said cutting means and applying a constant pressure on said cutting means as the hole is being cut in the workpiece; and d. a mandrel and clutch means for driving said cutting means, thereby making a hole in said workpiece.

22. The apparatus of claim 21 wherein said mounting means includes a pilot drill and tap means for drilling a pilot hole and tapping said pilot hole whereby the apparatus may be attached to the workpiece.

23. The apparatus of claim 21 wherein said cutting means includes cutting teeth mounted to a cutter holder, said cutting teeth having a cutting portion and a ramp portion, said ramp portion partially preventing said cutting portion from being exposed to said workpiece.

24. The apparatus of claim 23 which includes an adapting plate which holds said cutter holder to said camming plate and retaining spring means.

25. Apparatus for cutting a hole in a workpiece comprising a. mounting means for mounting said apparatus to said workpiece; said mounting means including a pilot drill and tap means for drilling a pilot hole and tapping said hole whereby the apparatus may be attached to the workpiece;

b. cutting means for cutting said hole in said workpiece;

c. pressure means for advancing said cutting means and applying constant pressure to said cutting means as the hole is being cut;

d. torque means for driving said cutting means thereby making a hole in said workpiece.

26. The apparatus of claim 25 wherein said cutting means includes cutting teeth mounted to a cutter holder, said cutting teeth having a cutting portion and a ramp portion, said ramp portion partially preventing said cutting portion from being exposed to said workpiece.

27. The apparatus of claim 25 wherein said pressure means includes a camming plate and retaining spring means connected to said cutting means.

28. The apparatus of claim 27 wherein said pressure means includes adapting means which holds said cutting means to said camming plate and retaining spring means.

29. The apparatus of claim 25 wherein said torque means includes a mandrel and clutch means connected to said mandrel.

* * * * *